(12) United States Patent
Blom et al.

(10) Patent No.: US 8,745,374 B2
(45) Date of Patent: Jun. 3, 2014

(54) SENDING PROTECTED DATA IN A COMMUNICATION NETWORK

(75) Inventors: Rolf Blom, Jarfalla (SE); Fredrik Lindholm, Stockholm (SE); John Mattsson, Taby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 23 days.

(21) Appl. No.: 13/498,970

(22) PCT Filed: Oct. 1, 2009

(86) PCT No.: PCT/SE2009/051093
§ 371 (c)(1),
(2), (4) Date: Mar. 29, 2012

(87) PCT Pub. No.: WO2011/040847
PCT Pub. Date: Apr. 7, 2011

(65) Prior Publication Data
US 2012/0191970 A1 Jul. 26, 2012

(51) Int. Cl.
*H04L 29/06* (2006.01)
(52) U.S. Cl.
USPC .......................................................... 713/153
(58) Field of Classification Search
USPC .......................................................... 713/153
See application file for complete search history.

(56) References Cited

U.S. PATENT DOCUMENTS

| 6,199,052 | B1 * | 3/2001 | Mitty et al. | 705/75 |
|---|---|---|---|---|
| 2004/0243994 | A1 * | 12/2004 | Nasu | 717/171 |
| 2005/0188220 | A1 * | 8/2005 | Nilsson et al. | 713/201 |
| 2009/0083538 | A1 * | 3/2009 | Merugu et al. | 713/153 |
| 2010/0228968 | A1 * | 9/2010 | Wason et al. | 713/156 |

* cited by examiner

*Primary Examiner* — Michael S McNally
(74) *Attorney, Agent, or Firm* — Rothwell, Figg, Ernst & Manbeck, P.C.

(57) ABSTRACT

A method of sending protected data from a sender unit to a receiver unit via an intermediate unit. The intermediate unit stores information associated with a certificate belonging to the receiver unit, and information associated with a certificate belonging to the intermediate unit, which has previously been signed by the receiver unit. The intermediate unit receives a request from the sender unit to send protected data to the receiver unit, and so it sends a response to the sender unit. The response includes the information associated with the certificate belonging to the receiver unit, which allows the sender unit to verify that the intermediate unit is authorized to receive data on behalf of the receiver unit. The intermediate unit then receives data from the sender unit that is protected using the information associated with the certificate belonging to the receiver unit for subsequent forwarding to the receiver unit. Having the receiver unit sign the intermediate unit's certificate allows the exchange of credentials to allow a sender unit to send protected data to a receiver unit via an intermediate unit.

16 Claims, 5 Drawing Sheets

SENDING PROTECTED DATA IN A COMMUNICATION NETWORK

CROSS-REFERENCE TO RELATED APPLICATION

This application is a 35 U.S.C. §371 National Phase Entry Application from PCT/SE2009/051093, filed Oct. 1, 2009, and designating the United States.

TECHNICAL FIELD

The invention relates to the field of sending protected in a communication network.

BACKGROUND

The Real-time Transport Protocol (RTP) is a protocol for delivering audio and video media data over a packet switched network. RTP is used for transporting real-time and streaming media data, such as interactive audio and video. It is therefore used in applications such is IPTV, conferencing, Voice over IP (VoIP).

Secure Real-time Transport Protocol (SRTP), specified in IETF RFC 3711, is a transport security protocol that provides a form of encrypted RTP. In addition to encryption, it provides message authentication and integrity, and replay protection, in unicast, multicast and broadcast applications. SRTP is used to protect content delivered between peers in an RTP session. SRTP is a transport security protocol and it is only intended to protect data during transport between two peers running SRTP. In particular, it does not protect data once it has been delivered to the endpoint of the SRTP session. In addition, the sending peer provides the protection by way of encryption of the media data, in other words it is assumed that the sending peer has knowledge of all keying material and is the one applying the protection of the data.

RTP is closely related to RTCP (RTP control protocol), which can be used to control the RTP session, and similarly SRTP has a sister protocol, called Secure RTCP (or SRTCP). SRTCP provides the same security-related features to RTCP as the ones provided by SRTP to RTP.

Utilization of SRTP or SRTCP is optional to utilization of RTP or RTCP; but even if SRTP/SRTCP are used, all provided features (such as encryption and authentication) are optional and can be separately enabled or disabled. The only exception is the message authentication/integrity feature, which is indispensably required when using SRTCP. Confidentiality protection in SRTP and SRTCP covers the payload, while integrity protection covers the payload and the full packet header.

Referring to FIG. 1, many content delivery systems and communication services include Store and Forward (SaF) mechanisms and require end-to-end confidentiality and integrity protection of media. In this scenario, a sender unit 1 sends media on a first hop between the sender unit 1 and an intermediate storage entity 2, and then (almost immediately or after some time) the media traverses a second hop from the storage entity 2 to the intended receiver unit 3. Note that the media may traverse more than one intermediate unit. However, each hop at an intermediate unit (such as a SaF Server) should be integrity protected. (The term "hop" is used herein to denote a logical link between two logically adjacent nodes in a network.) This is needed to allow an intermediate unit 2 to check the authenticity of media data packets arriving, for example where a mailbox or network answering machine stores media. This is necessary to protect against an attacker filling up the storage on the device with garbage. However, the keys necessary to decrypt the media or calculate/modify end-to-end (e2e) integrity protection should not be available to the intermediate unit, to prevent the intermediate unit from manipulating or having access to the plaintext media data.

It is possible for SRTP data to be sent via an intermediate unit, whilst ensuring that the intermediate unit does not have access to the data, by providing the media data with end-to-end protection between the sender unit 1 and the receiver unit 3.

A possible way to forward the media data from the intermediate unit 2 to the receiver unit 3 is by file transfer, for example by sending the media data in the format that was used to store it. However, this type of forwarding is not supported by SRTP.

To prevent attacks that may fill the intermediate unit 2 with bogus data, it is advantageous to ensure that the intermediate unit 2 authenticates the sender unit 1 of the media data, and furthermore, verify the authenticity of the media data. This requires that a hob-by-hop (hbh) key/security context is established between the sender unit 1 and the intermediate unit 2.

There is therefore a need for two independent security contexts; one end-to-end (e2e) security context to protect (by encryption or integrity protection) the data between the sender unit 1 and the receiver unit 3, and one hbh security context between the sender unit 1 and the intermediate unit 2 to allow the intermediate unit 2 to authenticate the sender unit 1 and to authenticate the media data. For hbh key establishment, any existing key management scheme like Multimedia Internet Keying (MIKEY) or Datagram Transport Layer Security-SRTP (DTLS-SRTP) could be used. Minor extensions to handle a SRTP (SaF) operation may be required. These key management protocols can also be used for e2e key management in certain situations.

Whilst establishing a key for hbh protection is relatively straightforward, it is not a straightforward matter to establish a key for e2e protection between the sender unit 1 and receiver unit 3 when the media data traverses an intermediate unit 2. If Multimedia Internet Keying (MIKEY) is used (see RFC 3830 for a description of MIKEY) to establish keys for e2e protection, then there are different options for key management as follows:

1. Using MIKEY in pre-shared key mode. In this scenario, an e2e pre-shared key must be available to the sender unit 1 at the time of making the call. This implies that it must be distributed in advance of the data being sent by a secure method, which leads to a key bootstrapping problem. The sender unit 1 must use a special procedure to get hold of the key for the intended receiver unit 3. This procedure could be an online procedure allowing the sender unit 1 to fetch a key when needed, or it could be, for example, a download of keys for all possible receiver units in the sender's phone book.

2. Using MIKEY in Rivest Shamir and Adleman (RSA) mode. In this scenario, the receiver unit's 3 credentials must be available in advance at the sender unit 1 side, and the same problems arise as for using MIKEY in pre-shared key mode.

3. Using MIKEY in Diffie-Hellman mode. This scenario does not work, as it requires both the sender unit 1 and receiver unit 3 to participate in a message exchange.

4. Using MIKEY in Reverse RSA (RSA-R) mode (see RFC 4738). This scenario also does not work as the end-point would have to be the intermediate unit 2, and so a key would be generated that would allow the intermediate unit 2 to access the media data.

One option which could be used together with different key management schemes is to exchange credentials when the sender unit 1 connects directly to the receiver unit 3. The parties could then store the credentials and use them when a call is redirected to an intermediate unit 2 such as a mail box. This would work for MIKEY RSA-R and DTLS-SRTP distribution of certificates. The problem with this option is that at least one direct connection between the sender unit 1 and receiver unit 3 has to have taken place before any data is redirected to an intermediate unit 2. A further problem is that both the sender unit 1 and receiver unit 3 must store the credentials, and the credentials can only be updated when the sender unit 1 and receiver unit 3 connect directly.

SUMMARY

The inventors have realised that there are no solutions to allow an exchange of credentials between a sender unit and receiver unit to allow end-to-end protection of media data when the media data is sent via an intermediate unit.

According to a first aspect of the invention, there is provided a method of sending protected data from a sender unit to a receiver unit via an intermediate unit. The intermediate unit stores information associated with a certificate belonging to the receiver unit, and information associated with a certificate belonging to the intermediate unit. The certificate belonging to the intermediate unit has previously been signed by the receiver unit. The intermediate unit receives a request from the sender unit to send protected data to the receiver unit, and so it sends a response to the sender unit, the response including the information associated with the certificate belonging to the receiver unit. This allows the sender unit to verify that the intermediate unit is authorised to receive data on behalf of the receiver unit. The intermediate unit then receives from the sender unit data protected using the information associated with the certificate belonging to the receiver unit for subsequent forwarding to the receiver unit. Having the receiver unit sign the intermediate unit's certificate allows the exchange of credentials to allow a sender unit to send protected data to a receiver unit via an intermediate unit.

Information associated with the certificate belonging to the receiver unit is any information that allows a node to obtain the certificate belonging to the receiver unit. For example, it could be the certificate itself, or information identifying a location of the certificate belonging to the receiver unit. Similarly, information associated with the certificate belonging to the intermediate unit may be the certificate itself or information identifying a location of the certificate belonging to the intermediate unit.

As an option, the request from the sender unit to send protected data to the receiver unit comprises a request for hop-by-hop protection between the sender unit and the intermediate unit (the hop-by-hop protection being based on the certificate belonging to the intermediate unit) and a request for end-to-end protection between the sender unit and the receiver unit. In this case, the response comprises an acceptance of the hop-by-hop protection between the intermediate unit and the sender unit, and a rejection of end-to-end protection between the intermediate unit and the sender unit.

When the receiver unit is ready to receive the protected data, the intermediate unit optionally receives from the receiver unit a request for the protected data. The request includes a request for hop-by-hop and end-to-end management. In response to the request for the protected data, the intermediate unit sends the protected media data to the receiver unit.

Examples of the sorts of protected data include Secure Real-time Transport Protocol data and Secure Multipurpose Internet Mail Extensions data.

An example of a node that acts as an intermediate unit is a Secure Real-time Transport Protocol Store and Forward mailbox.

According to a second aspect of the invention, there is provided an intermediate unit for receiving protected data on behalf of a receiver unit and sent from a sender unit in a communication network. The intermediate unit is provided with a memory for storing information associated with a certificate belonging to the receiver unit and information associated with a certificate belonging to the intermediate unit, the certificate belonging to the intermediate unit being signed by the receiver unit. A communications function is provided for receiving a request from the sender unit to send protected data to the receiver unit. A processor is also provided for handling messages. The communications function is arranged to send to the sender unit a response, the response including the information associated with the certificate belonging to the receiver unit, and is further arranged to receive, from the sender unit, data protected using the certificate belonging to the receiver unit for subsequent forwarding to the receiver unit.

The information associated with the certificate belonging to the receiver unit optionally comprises either the certificate itself or information identifying a location of the certificate. Similarly, the information associated with the certificate belonging to the intermediate unit comprises either the certificate belonging to the intermediate unit or information identifying a location of the certificate belonging to the intermediate unit.

The processor is optionally arranged to handle a request for hop-by-hop protection between the sender unit and the intermediate unit (the hop-by-hop protection being based on the certificate belonging to the intermediate unit), and a request for end-to-end protection between the sender unit and the receiver unit. The processor is further arranged to generate the response message, which includes an acceptance of the hop-by-hop protection between the intermediate unit and the sender unit, and a rejection of end-to-end protection between the intermediate unit and the sender unit.

The intermediate unit is optionally provided with a second memory for storing the received protected data.

A second communications function is optionally provided for receiving from the receiver unit a request for the protected data. The request includes a request for hop-by-hop and end-to-end management, and the second communications function is further arranged to send the protected media data to the receiver unit in response to the request.

An example of an intermediate unit is a Secure Real-time Transport Protocol Store and Forward mailbox.

According to a third aspect of the invention, there is provided a receiver unit for use in a communications network in which a sender unit sends protected data to the receiver unit via an intermediate unit. The receiver unit is provided with a certificate obtaining function for obtaining a certificate belonging to the intermediate unit. A certificate handling function is also provided for signing the certificate belonging to the intermediate unit using a certificate belonging to the receiver unit. A communication function is also provided for sending the signed certificate belonging to the intermediate unit and the certificate belonging to the receiver unit to the intermediate unit. This allows the intermediate unit to receive protected data on behalf of the receiver.

As an option, the receiver unit is provided with a message handling function for generating a request message for protected data stored at the intermediate unit and destined for the receiver unit. The request message further comprises a request for hop-by-hop and end-to-end management. In this case, the communication function is arranged to send the request message to the intermediate unit, and subsequently receive from the intermediate unit the requested protected data. A protected data handling function is also provided for handling the received protected data.

According to a fourth aspect of the invention, there is provided a sender unit for use in a communications network in which the sender unit sends protected data to a receiver unit via an intermediate unit. The sender unit is provided with a message handling function for generating a request message addressed to the receiver unit. The request message is to request establishment of a session for sending protected data. A communication function is provided for sending the request message towards the receiver unit. The communication function is arranged to receive from the intermediate unit a response to the request message, the response comprising information identifying a certificate belonging to the receiver unit. A data handling function is provided for protecting data using the certificate belonging to the receiver unit, and the communication function is further arranged to transmit the protected data to the intermediate unit. In this way, the sender unit, once it becomes aware that it must send data to the intermediate unit rather than the receiver unit, is provided with the certificates that it needs to send the protected data to the intermediate unit that is acting on behalf of the receiver unit.

As an option, the message handling function is arranged to generate the request message such that it comprises a request for hop-by-hop protection between the sender and the intermediate unit and a request for end-to-end protection between the sender and the receiver unit, and the communication function is arranged to receive the response. The response comprises an acceptance of the hop-by-hop protection between the intermediate unit and the sender, and a rejection of end-to-end protection between the intermediate unit and the sender. This informs the sender unit that it must not establish e2e protection with the intermediate unit, but hbh protection instead.

The protected data is optionally selected from one of Secure Real-time Transport Protocol data and Secure Multi-purpose Internet Mail Extensions data.

According to a fifth aspect of the invention, there is provided a computer program, comprising computer readable code which, when run on an intermediate unit, causes the intermediate unit to perform a method as described above for the first aspect of the invention.

According to a sixth aspect of the invention, there is provided a computer program, comprising computer readable code which, when run on a receiver unit, causes the receiver unit to behave as a receiver unit as described above for the third aspect of the invention.

According to a seventh aspect of the invention, there is provided a computer program, comprising computer readable code which, when run on a sender unit, causes the sender unit to behave as a sender unit as described above for the fourth aspect of the invention.

According to an eighth aspect of the invention, there is provided a computer program product comprising a computer readable medium and a computer program according as described above in any of the fifth, sixth or seventh aspects of the invention. The computer program is stored on the computer readable medium.

DETAILED DESCRIPTION

Figure 1:
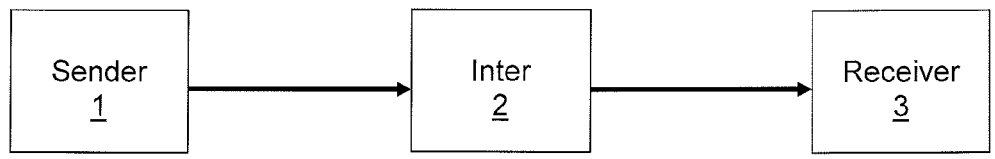
FIG. 1 illustrates schematically in a block diagram a network architecture when a sender sends information to a receiver unit via an intermediate unit.
Figure 2:
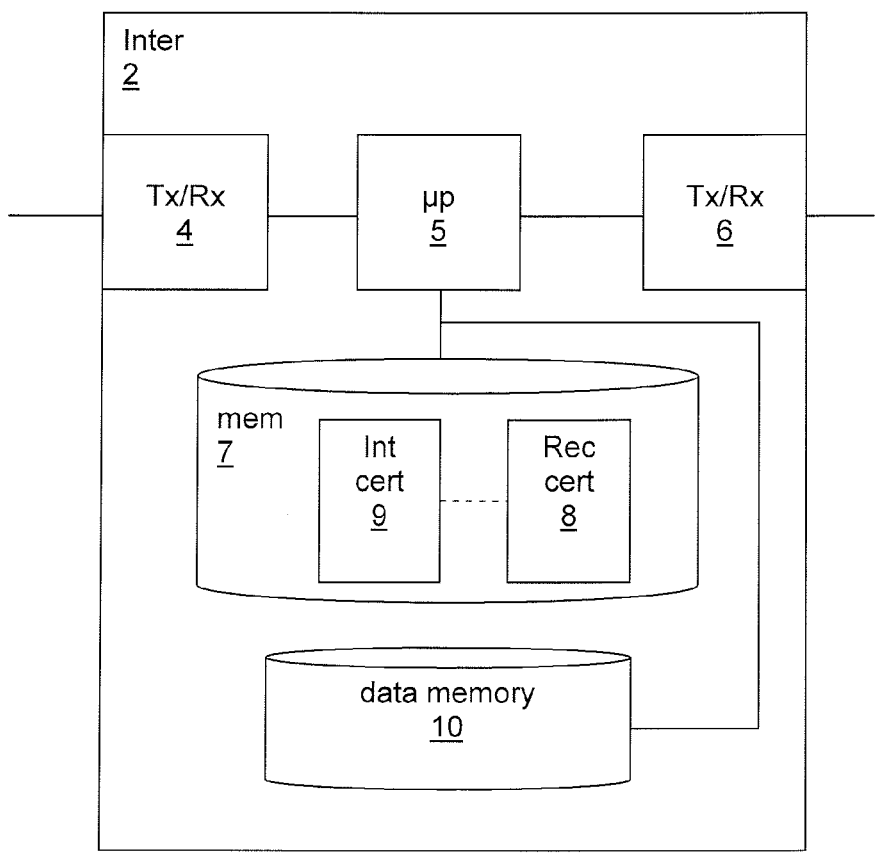
FIG. 2 illustrates schematically in a block diagram an intermediate unit according to an embodiment of the invention.

The invention relies on the use of certificates as credentials for e2e protection. A certificate comprises a digital signature that binds a public key with an identity, thereby allowing the person using the public key to verify the identity's ownership of it. Referring to FIG. 2 herein, the invention provides an intermediate unit 2 such as a SaF mailbox. The intermediate unit is provided with a communications function 4 such as a transceiver, to communicate with a sender unit 1. A processor 5 is provided for handling messages. A further communications function 6, such as a transceiver, is also provided for communicating with the receiver unit 3. A memory 7 is provided for storing information relating to subscribing receiver units.

Part of the information associated with each subscriber is a certificate chain that includes a certificate 8 belonging to the intended receiver unit 3 and a certificate 9 belonging to the intermediate unit 2 that has been signed by the intended receiver unit 3. As the certificate 9 belonging to the intermediate unit 2 has been signed by the intended receiver unit 3, it can be used to allow the intermediate unit 2 to sign messages on behalf of the receiver unit 3. Note that a certificate only contains public information. The private key corresponding to the receiver unit's certificate 8 should only be known by the receiver unit 3. Whilst the description refers to storing a certificate, it will be appreciated that information associated with the certificate that allows a party to obtain the certificate may be stored instead. For example, the information associated with a certificate may be the certificate itself, a URL identifying the certificate, or other information identifying the certificate owner and the location of the certificate.

The receiver unit's certificate 8 includes information about the receiver unit's public identity, making it possible for the sender unit 1 to verify that any data sent will reach the intended receiver unit 3. An example of such a public identity is that of a public identity of a user in an IP Multimedia Subsystem (IMS). The certificate information may be verified by checking the validity of the certificate (on-line or off-line) by use of a common root certificate.

In the example of FIG. 2, the certificate 8 belonging to the intended receiver unit 3 and the certificate 9 belonging to the intermediate unit 2 are shown as being stored in a memory 7 located at the intermediate unit 2. It will be appreciated that the certificates 8, 9 may be stored remotely from the intermediate unit 2 provided that they are accessible by the intermediate unit 2.

The intermediate unit 2 must in some way obtain the receiver unit's certificate 8. In a typical scenario, the intermediate unit 2 is a SRTP SaF mailbox, in which case it must include a second memory 10 for storing data before forwarding. Of course, the second memory 10 may be embodied as part of the same physical memory as the memory 7 in which the certificates 8, 9 are stored. A SRTP SaF mailbox may serve several subscribers. In this example, the receiver unit 3 wishes to subscribe to the SRTP SaF service.

Figure 3:
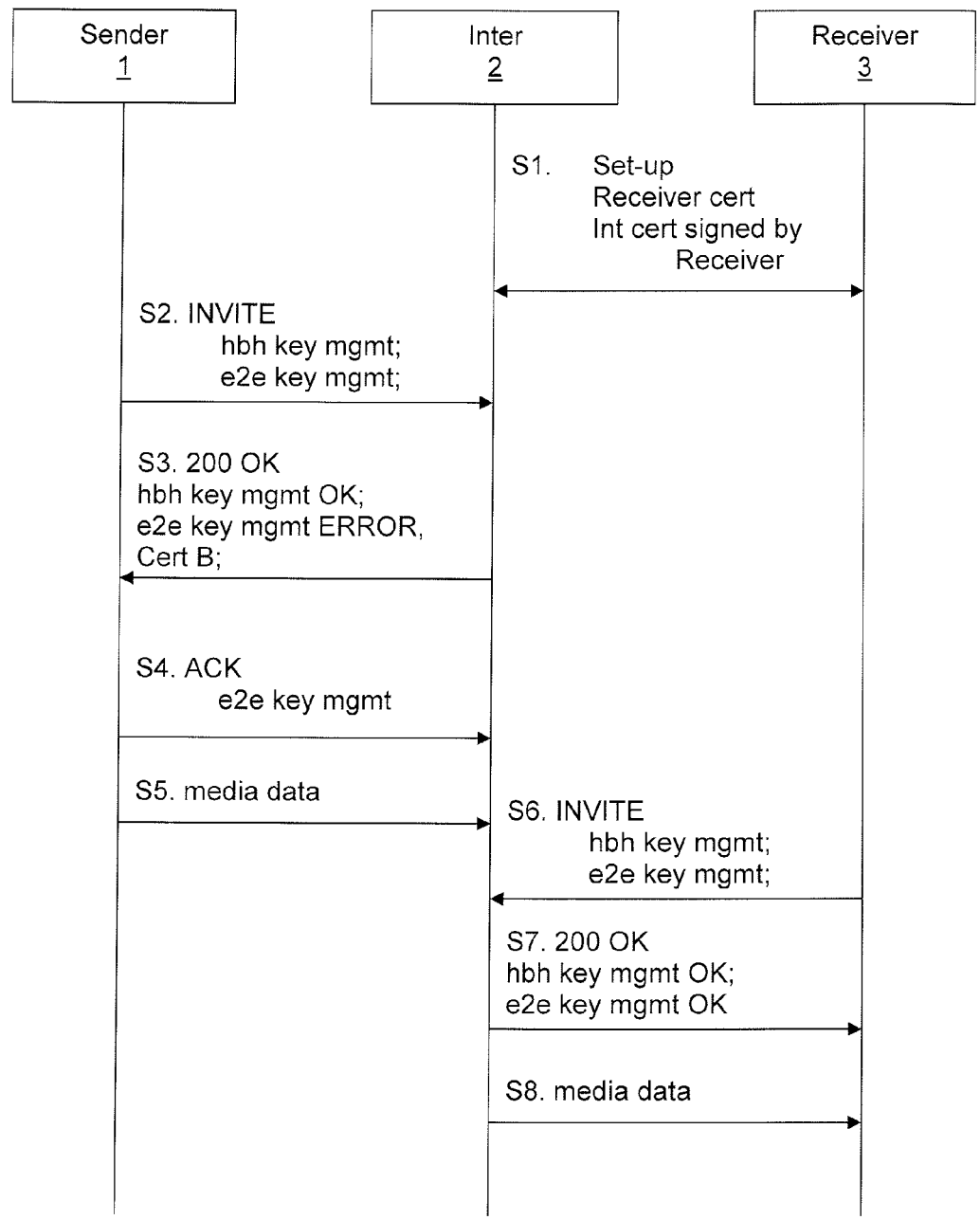
FIG. 3 is a signalling diagram illustrating signalling according to an embodiment of the invention.

Referring to FIG. 3 herein, the set-up signalling (S1) is carried out using a protected channel between the receiver unit 3 and the intermediate unit 2. End-point authentication is used to establish the protected channel. An example of endpoint authentication is an authentication procedure based on TLS that uses server and client certificates. This solution is particularly simple as the invention relies on the use of certificates in any case. The intermediate unit 2 is provided by a server with a certificate, as it has to use this when MIKEY RSA, MIKEY RSA-R or some other certificate based key agreement protocol is used for hbh protection. The intermediate unit certificate may be replaced with the intermediate unit certificate 9 signed by the receiver unit 3, which increases the trust that the message will be recorded on behalf of the receiver unit 3.

Once the intermediate unit 2 has received a copy of the receiver unit's certificate 8 and has a copy of its own certificate 9 signed by the receiver unit 3, it can then receive calls on behalf of the receiver unit 3, even where the sender unit 1 has not previously contacted the receiver unit 3 and has no knowledge of the receiver unit's certificate.

The security set-up when a call is made is described with reference to the signalling examples below. The following assumptions are used in the examples:

Hbh key management is performed using MIKEY RSA-R. Other possible key management protocols that could be used include MIKEY Pre-Shared Key (PSK), MIKEY RSA, MIKEY Diffie-Hellman) DH and DTLS-SRTP.

E2e key management is performed using MIKEY messages. MIKEY messages are assumed to be transferred in the Session Description Protocol (SDP) part of the SIP signalling (INVITE, 200 OK, ACK etc., see RFC 4567). Note that in the examples given below, some parameter assignments are omitted.

The sender unit 1 sends (S2) an INVITE to the receiver unit 3 at receiver@home. However, as the receiver unit 3 is not currently registered in the IMS system, the INVITE gets redirected to the intermediate unit 2 (which is the receiver unit's mailbox). The INVITE includes two offers; a first for hbh security and a second for e2e security. The two offers are included in the SDP part (see RFC 4567) of the INVITE. The intermediate unit 2 can infer from this that the sender unit 1 supports SRTP SaF. The INVITE message may include the following:

```
INVITE
....
SDP
....
m=........RTP/SAVP 99
a=rtpmap:99 AMR/8000
a=key-mgmt:mikey <RSA-R I_MESSAGE>
a=e2e-key-mgmt:mikey <RSA-R I_MESSAGE>
```

Both offers are in the example message above are MIKEY RSA-R.

The intermediate unit 2 receiving the INVITE supports SRTP SaF, and replies (S3) to respond to both the hbh and the e2e offer sent in the INVITE message. The intermediate unit 2 accepts the hbh key establishment procedure, generating the appropriate response message (MIKEY RSA-R R_MESSAGE). The offer of using MIKEY RSA-R for e2e protection is, however, rejected. This is because the intermediate unit 2 is not the intended receiver unit 3, and should not have access to the plaintext data sent via the intermediate unit 2. An error message is sent in response to the request for e2e protection. The error message includes an error code indicating that that the intermediate unit 2 isn't the intended receiver unit. The error message also includes the receiver unit's certificate 8 (or a link to it). The error message may contain additional information such as certificate chain information and proof of non-revocation. The error message may be signed with the intermediate unit certificate 9 signed by the receiver unit 3. The 200 OK message sent in response to the INVITE message may include the following:

```
200 OK / 18x provisional response
.....
SDP
...
m=......RTP/SAVP 99
a=key-mgmt: mikey <RSA-R R_MESSAGE>
a=e2e-key-mgmt:mikey |<MIKEY RSA-R E_MESSAGE; signed>
```

Note that the SIP message in which the MIKEY is carried will depend on the situation. It can be either in a 200 OK (assuming resources etc. are all setup) or an 18× provisional response (which is used, for example, when not all resources have been confirmed).

When the sender unit 1 receives the 200 OK/18× provisional response, he becomes aware that the hbh security is accepted while the e2e offer isn't accepted. The error message tells him that the offer isn't accepted as the entity generating the error isn't the receiver unit 3. The error message contains the receiver unit's certificate 8 and the message is signed by the intermediate unit 2 with the intermediate unit certificate 9 signed by the receiver unit 3. The error message may contain additional information, such as a full certificate chain, certificate revocation information, etc.

Note that the defined error messages in RFC 3830 cannot transfer the information required, and so it is necessary for new error codes to be defined.

As the sender unit 1 now has the receiver unit's certificate 8, he can now use MIKEY RSA to set up the e2e protection. Any data sent will therefore be e2e protected between the sender unit 1 and the receiver unit 3, and hbh protected between the sender unit 1 and the intermediate unit 2. This ensures that the intermediate unit 2 cannot access the plaintext data. The sender unit 1 sends an ACK message (S4), an example of which is as follows:

```
Update/ACK
....
SDP
....
m=......RTP/SAVP 99
a= e2e-key-mgmt: mikey <RSA I_MESSAGE >
```

In the event that the sender unit already has the receiver unit's certificate 8, MIKEY-RSA can be used to set up the e2e protection in (S2). The intermediate unit 2 accepts the hbh key establishment procedure, generating an appropriate response message. The offer of using MIKEY-RSA for e2e protection is, also accepted. No key establishment is done in the ACK message (S4).

Note that the SIP message in which the MIKEY is carried will depend on the situation. It may be either in ACK (in the example in which a 200 OK was received from the intermediate unit 2) or an UPDATE (in the example in which an 18× provisional response was received from the intermediate unit 2).

The MIKEY RSA message is received by the intermediate unit 2, and is stored there and later is forwarded to the receiver unit 3 for when the receiver unit 3 calls the intermediate unit 2 to retrieve messages (typically voicemail messages in this example).

Once e2e and hbh protection have been set up, the protected media data is sent (S5) from the sender unit 1 to the intermediate unit 2, and stored at the intermediate unit 2 until the receiver unit 3 becomes available in the network to receive the media data.

When the receiver unit 3 next attaches to the network he is made aware that he has media data (such as a voice message) available from the intermediate unit 2. The receiver unit 3 sends (S6) an INVITE message to the intermediate unit 2 with an offer containing both e2e and hbh security. This tells the intermediate unit 2 that the receiver unit 3 understands SRTP SaF. The intermediate unit 2 sends (S7) a 200 OK message to accept both offers, and includes all security contexts for recorded messages in the response. An example 200 OK (or 18× provisional) response is as follows:

---

200 OK / 18x provisional response
.....
SDP
...
m=......RTP/SAVP 99
a=key-mgmt: mikey <RSA-R R_MESSAGE>
a=e2e-key-mgmt:mikey <MIKEY RSA-R R_MESSAGE>
a = e2e-key-mgmt:mikey <MIKEY RSA I_MESSGE>  ;stored msg ctxt1
a = e2e-key-mgmt:mikey <MIKEY RSA I_MESSGE>  ;stored msg ctxt2
....

---

Note that the term a=key-mgmt: mikey <RSA-R R_MESSAGE> related to hbh key management.

Once the e2e and hbh protection is established with the receiver unit 3, the intermediate unit 2 can send (S8) the protected media data that it has been storing.

It will be appreciated that an INVITE will not necessarily be routed to an intermediate unit 2 such as a SaF mailbox. For example, if the receiver unit 3 is connected to the network, the INVITE will be routed directly to the receiver unit 3. In this case, where a sender unit 1 sends an INVITE as described above, and the offer is received by the receiver unit 3, the receiver unit 3 may reject the offer for e2e protection and accept and sign the response for hbh protection with his certificate 8. In this way, the sender unit 1 becomes aware that there is a direct connection to the intended receiver unit 3 and the identity of the receiver unit 3 verified by the certificate 8. Of course, the receiver unit 3 may accept both the hbh offer and the e2e offer, but this is unnecessary as there are no intermediate SaF nodes between the sender unit 1 and the receiver unit 3. This assumes that both parties are online, in which case it is sufficient to only have hbh protection. However, if data such as a message has been left in storage and the storing device later calls the receiver unit, then e2e protection will be required in addition to hbh protection.

Figure 4:
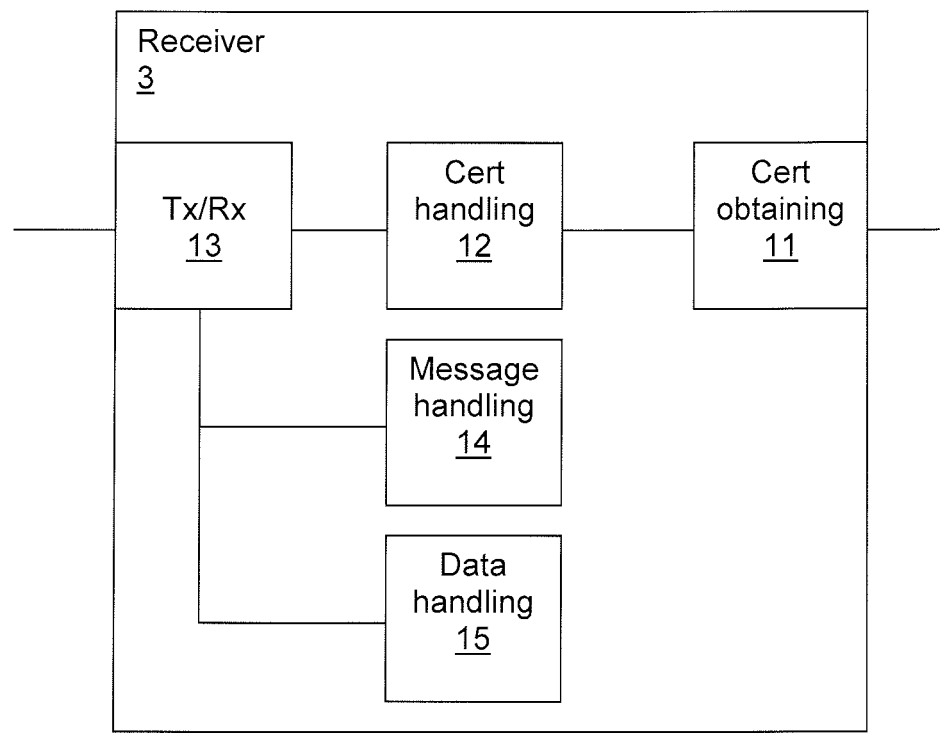
FIG. 4 illustrates schematically in a block diagram a receiver unit according to an embodiment of the invention.

Turning now to FIG. 4 herein, there is illustrated a receiver unit 3. The receiver unit 3 is provided with a certificate obtaining function 11 for obtaining a certificate belonging to the intermediate unit 2. The certificate obtaining function 11 may obtain a certificate from a certifying authority, from a memory or from another external node. A certificate handling function 12 is also provided for signing the certificate 9 belonging to the intermediate unit 2 using a certificate 8 belonging to the receiver unit. A communication function 13 (which is typically a transceiver or combination of one or more transmitters and receivers) is provided for sending the signed certificate 9 belonging to the intermediate unit and the certificate 8 belonging to the receiver unit to the intermediate unit. The receiver unit 3 is also provided with a message handling function 14 for generating a request message for protected data stored at the intermediate unit 2 and destined for the receiver unit 3, the request message further comprising a request for hop-by-hop and end-to-end management. In this case, the communication function 13 is arranged to send the request message to the intermediate unit 2, and subsequently receive from the intermediate unit 2 the requested protected data. A protected data handling function 15 is also provided for handling the received protected data.

Figure 5:
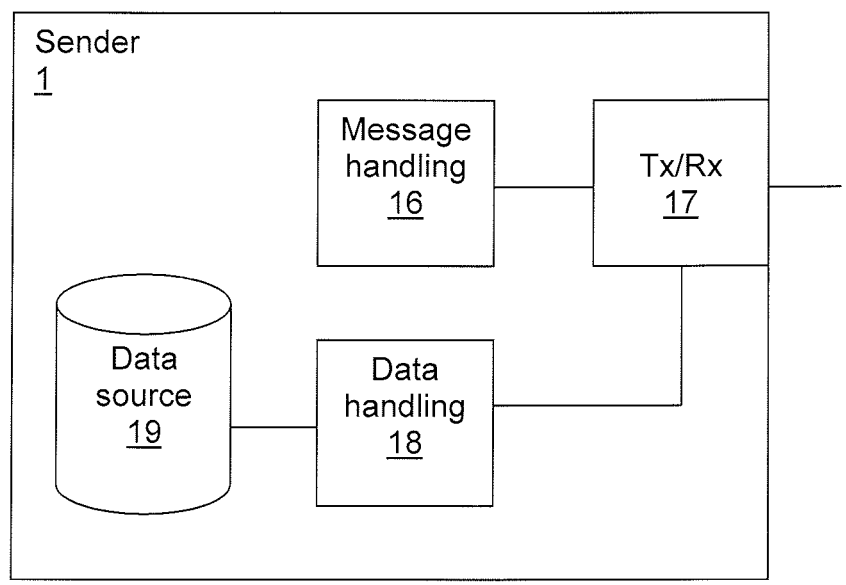
FIG. 5 illustrates schematically in a block diagram a sender unit according to an embodiment of the invention.

Referring now to FIG. 5 herein, the sender unit 1 is provided with a message handling function 16 for generating a request message addressed to the receiver unit 3, the request message requesting establishment of a session in which to send protected data. A communication function 17 is also provided for sending the request message towards the receiver unit. The communication function is typically a transceiver, or combination of one or more transmitters and receivers, and is arranged to receive from the intermediate unit 2 a response to the request message. The response includes information identifying the certificate 8 belonging to the receiver unit 3. A data handling function 18 is provided for protecting data using the certificate 8 belonging to the receiver unit 3, and the protected data can then be sent to the intermediate unit 2 using the communication function 17. The message handling function 16 is arranged to generate a request message that comprises a request for hbh protection between the sender unit 1 and the intermediate unit 2, and a request for e2e protection between the sender unit 1 and the receiver unit, and the communication function 17 is arranged to receive a message that comprises an acceptance of the hbh protection between the intermediate unit 2 and the sender unit 1, and a rejection of e2e protection between the intermediate unit 2 and the sender unit 1.

Figure 6:
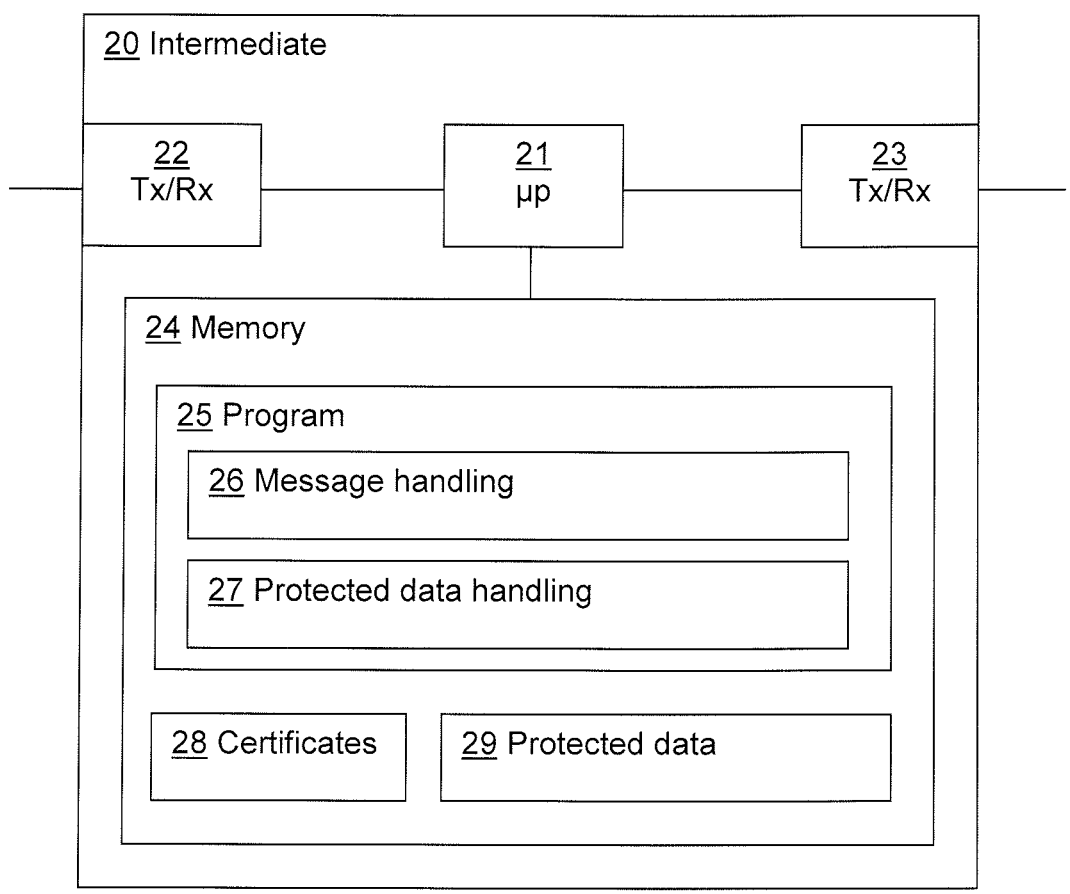
FIG. 6 illustrates schematically in a block diagram an intermediate unit according to a further embodiment of the invention.

It will be appreciated that the above-described hardware may be implemented by using software. To illustrate this, FIG. 6 shows an alternative embodiment of an intermediate unit 20. In this case, the intermediate unit 20 comprises a processor 21, a communications function 22 for communicating with the sender unit 1, and a communications function for communicating with the receiver unit 3. The intermediate unit 20 also comprises a computer program product in the form of a memory 24. The memory 24 comprises a program 25 that can be run by the processor. The program 25 includes a message handling function 26 and a protected data handling function 27. The memory 24 may also have be used to store the certificates 28 and the protected data 29 received from the sender unit 1 before it gets sent to the receiver unit 3. Of course, whilst the memory 24 shown in FIG. 6 is a single memory that stores each of the program 25, the certificates 28 and the protected data 29, each of these may be stored in different physical memories.

Figure 7:
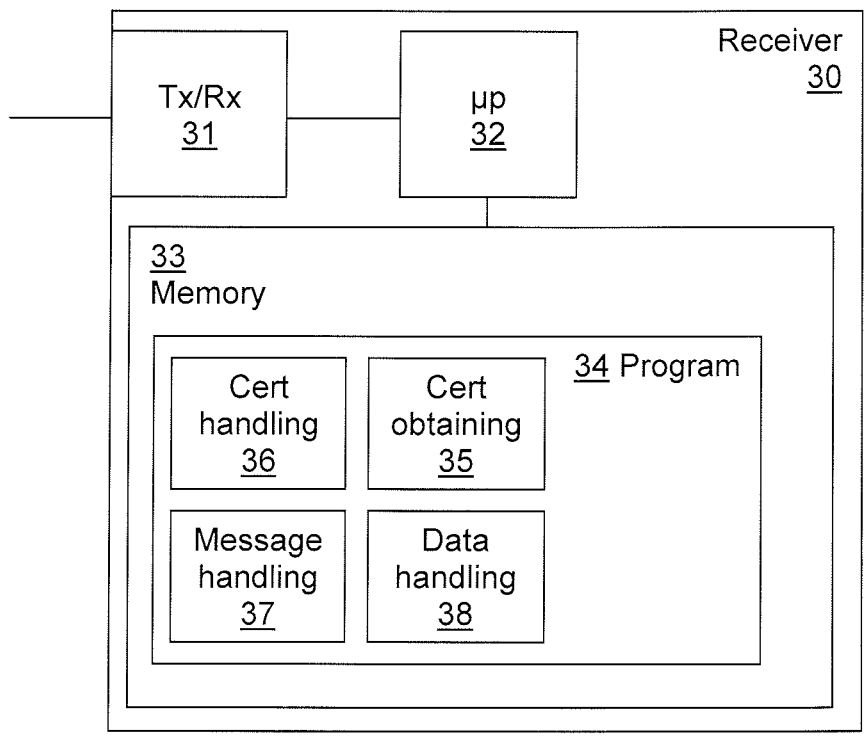
FIG. 7 illustrates schematically in a block diagram a receiver unit according to a further embodiment of the invention.

FIG. 7 illustrates a receiver unit that uses software to implement the invention. In this case, the receiver unit 30 comprises a communications function 31 for communicating with the intermediate unit 2 and a processor 32 for handling messages and data. A computer program product in the form of a memory 33 is also provided, in which a program 34, executable by the processor, is stored. The program 34 includes a certificate handling function 36 and a certificate obtaining function for signing the intermediate unit's 2 certificate 9 and providing the receiver unit's certificate 8. The program 34 also includes a message handling function 37 for handling signalling, and a data handling function 38 for handling received protected data from the intermediate unit 2.

Figure 8:
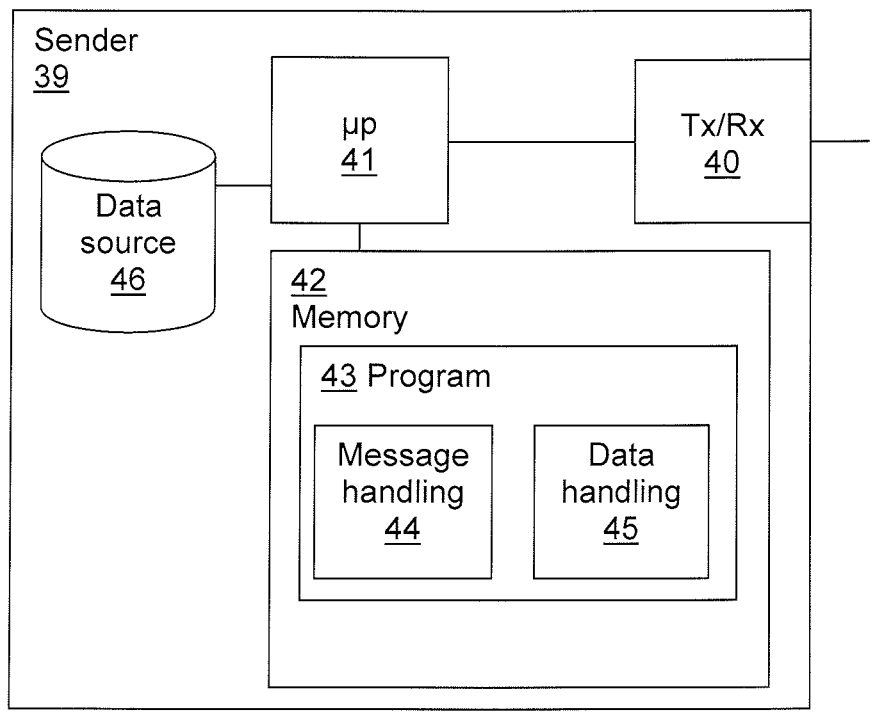
FIG. 8 illustrates schematically in a block diagram a sender unit according to a further embodiment of the invention.

FIG. 8 illustrates a sender unit 39 that uses software to implement the invention. In this embodiment, the sender unit 38 is provided with a communications device 40 for communicating with the intermediate unit 2 and a processor for handling messaging, sending of data, authentication and so on. A computer program product in the form of a memory 42 is provided, in which a program 43 executable by the processor 41 is stored. The program includes a message handling function and a data handling function. A data source 46 provides the data that is e2e and hbh protected and sent to the intermediate unit 2. Any suitable data source may be used, for example a remote streaming server, a memory containing the data, an IPTV head end and so on.

The invention provides a key management procedure for SaF situations and it uses a standard security set-up offer for the sender unit 1, thereby minimizing changes that must be made to existing signalling in order to send protected data.

It will be appreciated by the person of skill in the art that various modifications may be made to the above-described embodiments without departing from the scope of the invention. For example, the above description describes the invention using the scenario of the intermediate unit 2 being a SaF mailbox for receiving, storing and subsequently sending protected SRTP data. However, the invention can be used with protocols other than SRTP. The skilled person will be able to apply the invention to, for example, the Secure/Multipurpose Internet Mail Extensions (S/MIME) protocol for an intermediate mailbox that must store email messages before forwarding them to the ultimate receiver unit. Furthermore, whilst it is described that the intermediate unit certificate 9 is signed by the receiver unit 3, there are different possibilities for generating/signing the certificate 9. From a security point of view it may be sufficient if the receiver unit 3 generates a public private key pair and sends the private key and the certificate to the intermediate unit 2. Another possibility is for the intermediate unit to generate a public private key pair and use an enrolment protocol towards the receiver unit 3 to get the certificate 9.

The following abbreviations have been used in this description:

| | |
|---|---|
| e2e | end-to-end |
| DLTS | Datagram Transport Layer Security |
| hbh | hop-by-hop |
| IMS | IP Multimedia Subsystem |
| MIKEY | Multimedia Internet KEYing |
| RTCP | RTP Control Protocol |
| RTP | Real-time Transport Protocol |
| SaF | Store and Forward |
| SDP | Session Description Protocol |
| S/MIME | Secure Multipurpose Internet Mail Extensions |
| SRTCP | Secure RTCP |
| SRTP | Secure Real-time Transport Protocol |
| VoIP | Voice over IP |

The invention claimed is:

1. A method of sending protected data from a sender unit to a receiver unit via an intermediate unit, the method comprising, at the intermediate unit:
   storing information associated with a certificate belonging to the receiver unit, and information associated with a certificate belonging to the intermediate unit, the certificate belonging to the intermediate unit being signed by the receiver unit;
   receiving a request from the sender unit to send protected data to the receiver unit;
   sending a response to the sender unit, the response including the information associated with the certificate belonging to the receiver unit;
   receiving from the sender unit data protected using the information associated with certificate belonging to the receiver unit for subsequent forwarding to the receiver unit,
   wherein the request from the sender unit to send protected data to the receiver unit comprises a request for hop-by-hop protection between the sender unit and the intermediate unit, the hop-by-hop protection being based on the certificate belonging to the intermediate unit, and a request for end-to-end protection between the sender unit and the receiver unit; and the response comprises an acceptance of the hop-by-hop protection between the intermediate unit and the sender unit, and a rejection of end-to-end protection between the intermediate unit and the sender unit.

2. The method according to claim 1, wherein the information associated with the certificate belonging to the receiver unit comprises one of the certificate belonging to the receiver unit and information identifying a location of the certificate belonging to the receiver unit; and
   the information associated with the certificate belonging to the intermediate unit comprises one of the certificates belonging to the intermediate unit and information identifying a location of the certificate belonging to the intermediate unit.

3. The method according to claim 1, further comprising, at the intermediate unit:
   receiving from the receiver unit a request for the protected data, the request including a request for hop-by-hop and end-to-end management; and
   in response to the request for the protected data, sending the protected media data to the receiver unit.

4. The method according to claim 1, wherein the protected data is selected from one of Secure Real-time Transport Protocol data and Secure Multipurpose Internet Mail Extensions data.

5. The method according to claim 1, wherein the intermediate unit is a Secure Real-time Transport Protocol Store and Forward mailbox.

6. An intermediate unit for receiving protected data on behalf of a receiver unit and sent from a sender in a communication network, the intermediate unit comprising:
   a memory information configured to store information associated with a certificate belonging to the receiver unit and information associated with a certificate belonging to the intermediate unit, the certificate belonging to the intermediate unite being signed by the receiver unit;

a transceiver configured to receive a request from the sender unit to send protected data to the receiver unit;

a processor, coupled to the memory, wherein the processor is configured to:

handle messages, send to the sender unit a response, the response including the information associated with the certificate belonging to the receiver unit, and receive, from the sender unit, data protected using the certificate belonging to the receiver unit for subsequent forwarding to the receiver unit, wherein the processor is further configured to:

handle a request for hop-by-hop protection between the sender unit and the intermediate unit, the hop-by-hop protection being based on the certificate belonging to the intermediate unit, handle a request for end-to-end protection between the sender unit and the receiver unit, and generate the response message, the response message comprising an acceptance of the hop-by-hop protection between the intermediate unit and the sender unit, and a rejection of end-to-end protection between the intermediate unit and the sender unit.

7. The intermediate unit according to claim 6, wherein the information associated with the certificate belonging to the receiver unit comprises one of the certificate belonging to the receiver unit and information identifying a location of the certificate belonging to the receiver unit, and the information associated with the certificate belonging to the intermediate unit comprises one of the certificate belonging to the intermediate unit and information identifying a location of the certificate belonging to the intermediate unit.

8. The intermediate unit according to claim 6, further comprising:

a second memory for storing the received protected data.

9. The intermediate unit according to claim 6, further comprising:

a second communications function for receiving from the receiver unit a request for the protected data, the request including a request for hop-by-hop and end-to-end management, the second communications function being further arranged to, in response to the request for the protected data, send the protected media data to the receiver unit.

10. The intermediate unit according to claim 6, wherein the intermediate unit is a Secure Real-time Transport Protocol Store and Forward mailbox.

11. A receiver unit for use in a communications network in which a sender unit sends protected data to the receiver unit via an intermediate unit, the receiver unit comprising:

a processor configured to:

obtain a certificate belonging to the intermediate unit, sign the certificate belonging to the intermediate unit using a certificate belonging to the receiver unit, and send the signed certificate belonging to the intermediate unit and the certificate belonging to the receiver unit to the intermediate unit, wherein the processor is further configured to:

generate a request message for protected data stored at the intermediate unit and destined for the receiver unit, the request message further comprising a request for hop-by-hop and end-to-end management, send the request message to the intermediate unit, and subsequently receive from the intermediate unit the requested protected data, and handle the received protected data.

12. A sender unit for use in a communications network in which the sender unit sends protected data to a receiver unit via an intermediate unit, the sender unit comprising:

a processor configured to:

generate a request message addressed to the receiver unit, the request message requesting establishment of a session in which to send protected data, send the request message towards the receiver unit, receive from the intermediate unit a response to the request message, the response comprising information identifying a certificate signed by the receiver unit, protect data using the certificate belonging to the receiver unit, and transmit the protected data to the intermediate unit, wherein the processor is further configured to:

generate the request message such that it comprises a request for hop-by-hop protection between the sender unit and the intermediate unit and a request for end-to-end protection between the sender unit and the receiver unit, and receive the response, wherein the response comprises an acceptance of the hop-by-hop protection between the intermediate unit and the sender unit, and a rejection of end-to-end protection between the intermediate unit and the sender unit.

13. The sender unit according to claim 12, wherein the protected data is selected from one of Secure Real-time Transport Protocol data and Secure Multipurpose Internet Mail Extensions data.

14. A non-transitory computer readable medium having instructions stored therein, which when executed by a processor in an intermediate unit causes the processor to execute a method comprising:

storing information associated with a certificate belonging to a receiver unit, and information associated with a certificate belonging to the intermediate unit, the certificate belonging to the intermediate unit being signed by the receiver unit;

receiving a request from a sender unit to send protected data to the receiver unit;

sending a response to the sender unit, the response including the information associated with the certificate belonging to the receiver unit; and receiving from the sender unit data protected using the information associated with certificate belonging to the receiver unit for subsequent forwarding to the receiver unit, wherein the request from the sender unit to send protected data to the receiver unit comprises a request for hop-by-hop protection between the sender unit and the intermediate unit, the hop-by-hop protection being based on the certificate belonging to the intermediate unit, and a request for end-to-end protection between the sender unit and the receiver unit; and the response comprises an acceptance of the hop-by-hop protection between the intermediate unit and the sender unit, and a rejection of end-to-end protection between the intermediate unit and the sender unit.

15. A non-transitory computer readable medium having instructions stored therein, which when executed by a processor in a receiver unit causes the processor to execute a method comprising:

obtaining a certificate belonging to the intermediate unit;

signing the certificate belonging to the intermediate unit using a certificate belonging to the receiver unit; and sending the signed certificate belonging to the intermediate unit and the certificate belonging to the receiver unit to the intermediate unit, wherein the processor is further configured to:

generate a request message for protected data stored at the intermediate unit and destined for the receiver unit, the request message further comprising a request for hop-by-hop and end-to-end management, send the request message to the intermediate unit, and subsequently receive from the intermediate unit the requested protected data, and handle the received protected data.

16. A non-transitory computer readable medium having instructions stored therein, which when executed by a processor in a sender unit causes the processor to execute a method comprising:

generating a request message addressed to a receiver unit, the request message requesting establishment of a session in which to send protected data;

sending the request message towards the receiver unit;

receiving from the intermediate unit a response to the request message, the response comprising information identifying a certificate signed by the receiver unit;

protecting data using the certificate belonging to the receiver unit; and transmitting the protected data to the intermediate unit, wherein the processor is further configured to:

generate the request message such that it comprises a request for hop-by-hop protection between the sender unit and the intermediate unit and a request for end-to-end protection between the sender unit and the receiver unit, and receive the response, wherein the response comprises an acceptance of the hop-by-hop protection between the intermediate unit and the sender unit, and a rejection of end-to-end protection between the intermediate unit and the sender unit.

* * * * *